(12) United States Patent
Pfau et al.

(10) Patent No.: US 9,696,191 B2
(45) Date of Patent: Jul. 4, 2017

(54) THERMAL, FLOW MEASURING DEVICE

(71) Applicant: Endress + Hauser Flowtec AG, Reinach (CH)

(72) Inventors: Axel Pfau, Aesch (CH); Panagiotis Papathanasiou, Basel (CH); Stephan Gaberthuel, Oberwil (CH); Tobias Baur, Reinach (CH); Hanno Schultheis, Lorrach (DE)

(73) Assignee: Endress + Hauser Flowtec AG, Reinach (CH)

( * ) Notice: Subject to any disclaimer, the term of this patent is extended or adjusted under 35 U.S.C. 154(b) by 34 days.

(21) Appl. No.: 14/436,156

(22) PCT Filed: Sep. 23, 2013

(86) PCT No.: PCT/EP2013/069682
§ 371 (c)(1),
(2) Date: Apr. 16, 2015

(87) PCT Pub. No.: WO2014/060187
PCT Pub. Date: Apr. 24, 2014

(65) Prior Publication Data
US 2015/0300856 A1    Oct. 22, 2015

(30) Foreign Application Priority Data

Oct. 19, 2012 (DE) .................. 10 2012 110 012
Jul. 29, 2013 (DE) .................. 10 2013 108 099

(51) Int. Cl.
*G01F 1/69* (2006.01)
*G01P 5/12* (2006.01)
*G01F 1/684* (2006.01)

(52) U.S. Cl.
CPC ............ *G01F 1/69* (2013.01); *G01F 1/684* (2013.01); *G01F 1/6842* (2013.01); *G01P 5/12* (2013.01)

(58) Field of Classification Search
CPC . G01F 1/684; G01F 1/69; G01F 1/692; G01P 5/12
See application file for complete search history.

(56) References Cited

U.S. PATENT DOCUMENTS 3,435,400 A * 3/1969 Beckman ............... A61B 5/028
                                                        338/28
3,595,079 A * 7/1971 Grahn .................... G01F 1/684
                                                        600/505
(Continued)

FOREIGN PATENT DOCUMENTS

CN    1155653 A    7/1997
DE    3935778 A1   10/1990
(Continued)

OTHER PUBLICATIONS

English Translation of International Preliminary Report on Patentability, WIPO, Geneva, Apr. 30, 2015.
(Continued)

*Primary Examiner* — Francis Gray
(74) *Attorney, Agent, or Firm* — Bacon & Thomas, PLLC

(57) ABSTRACT

A thermal, flow measuring device for determining and/or monitoring a mass flow of a measured medium through a measuring tube, comprising a sensor having a first heatable resistance thermometer and at least a second heatable resistance thermometer, wherein the sensor has a longitudinal axis and an end face, which is divided into at least two adjoining segments, wherein a surface normal vector of at
(Continued)

least a first segment forms with the longitudinal axis of the sensor an angle of at least 5°; and use of a thermal, flow measuring device.

15 Claims, 11 Drawing Sheets

(56) References Cited

U.S. PATENT DOCUMENTS

| | | | | |
|---|---|---|---|---|
| 5,428,994 A | * | 7/1995 | Wenzel | G01F 1/684 73/204.22 |
| 5,848,094 A | * | 12/1998 | Buhl | G01F 1/684 374/147 |
| 6,253,606 B1 | | 7/2001 | Yonezawa et al. | |
| 2010/0312498 A1 | * | 12/2010 | Hamann | G01F 1/6842 702/45 |

FOREIGN PATENT DOCUMENTS

| | | |
|---|---|---|
| DE | 4233284 A1 | 4/1994 |
| DE | 19640773 A1 | 4/1997 |
| DE | 29907566 U1 | 9/1999 |
| DE | 19855884 A1 | 12/1999 |
| DE | 29522442 U1 | 7/2004 |
| DE | 102004058553 A1 | 6/2006 |
| DE | 102005030961 A1 | 1/2007 |
| JP | 2009156826 A | 7/2009 |
| WO | 2006058863 A1 | 6/2006 |

OTHER PUBLICATIONS

International Search Report,, EPO, The Netherlands, Dec. 5, 2013.
German Search Report, German PTO, Munich, Apr. 10, 2013.

* cited by examiner

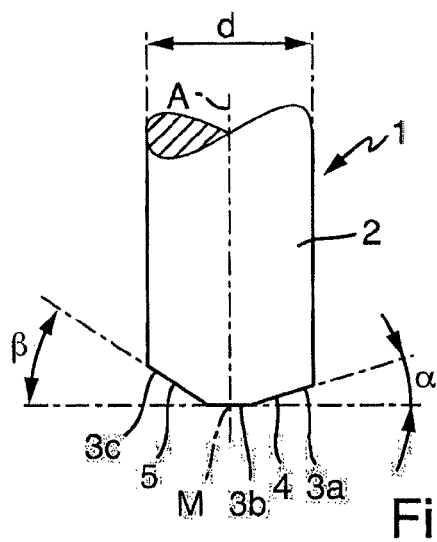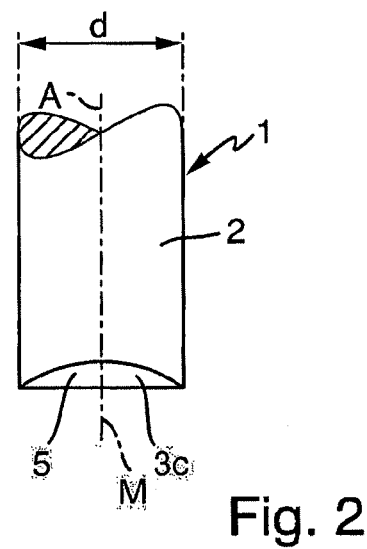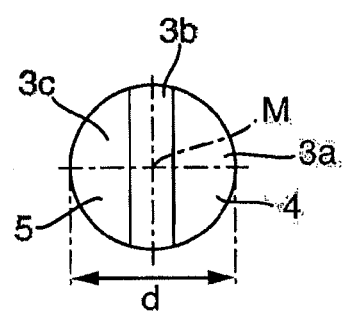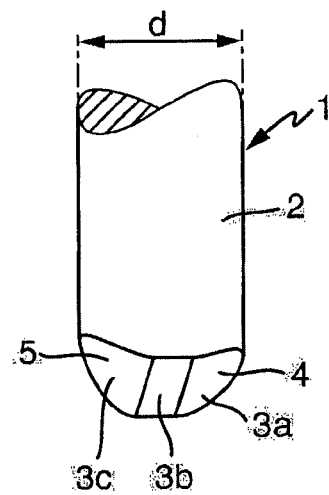

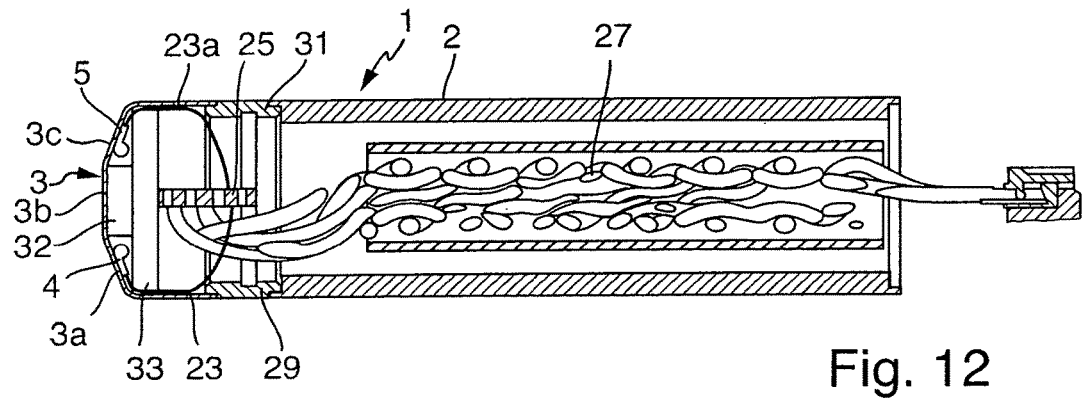
Fig. 12
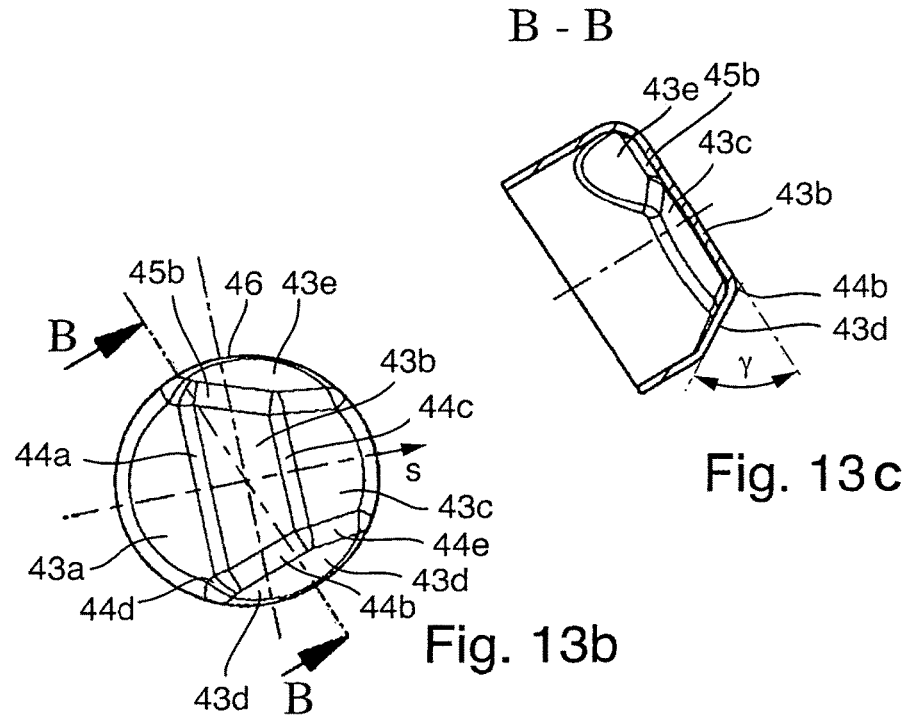
Fig. 13c
Fig. 13b

THERMAL, FLOW MEASURING DEVICE

TECHNICAL FIELD

The invention relates to a thermal, flow measuring device as defined in the preamble of claim 1, as well as to a use of such a thermal, flow measuring device.

BACKGROUND DISCUSSION

Sensors for flow measuring devices are known, which work according to the thermal measuring principle. This measuring principle is based on the cooling of a heated resistance thermometer, subsequently also referred to herein as the heating, or active, sensor element, from which heat is withdrawn by the flowing measured medium. The withdrawn energy is resupplied by increasing the electrical heating current. In this way, a constant temperature difference is maintained between the heating and measuring sensor element, thus the active sensor element, and a reference temperature sensor element, which is referred to subsequently herein also as the measuring or passive sensor element. The greater the mass flow, the more energy is required, in order to maintain this difference. The measured heating current is, as a result thereof, proportional to the mass flow. The thermal measuring principle is well established in processes, in which a product is made from a raw or starting material by the application of chemical, physical or biological procedures and is applied successfully in numerous applications. Especially demanding is the application of the measuring principle in water and other liquids such as e.g. oil, since in such cases the heat transfer and the required heating power are in comparison to gases significantly higher and the relevant material properties are very strongly temperature dependent. In the case of velocities >2.5 m/s, therefore, a flattening of the characteristic curve and therewith a lessened sensitivity can be experienced. Moreover, at smaller separations of the sensor elements from one another, in given cases, crosstalk from the active sensor element to the temperature measuring sensor element can be experienced, e.g. in the case of low velocities <0.2 m/s.

Known are sensors, which are composed of two sensor elements, an active element and a passive element, each of which has a cylindrical sensor cap and protrudes from a base surface of a sensor. Soldered in the end face of the sensor caps are resistance sensors. Due to the cylindrical sensor caps, the sensor elements have good thermal insulation and so no crosstalk is experienced. These sensors exhibit, however, a worse characteristic in water than the earlier mentioned sensors. Thus, in the case of increasing flow, the characteristic curve reaches comparatively rapidly a saturation at a maximum power. Upon reaching this power limit, at greater velocity, heat can no longer be transferred into the flow. Since the characteristic curve represents the measuring range for the flow velocity of the medium, within which a measuring can occur, a fast reaching of saturating means measuring is no longer possible in the case of flows that are too fast.

SUMMARY OF THE INVENTION

It is thus an object of the present invention to expand the measuring range of a thermal, flow measuring device.

This object is achieved by a thermal, flow measuring device for determining and/or monitoring a mass flow of a measured medium through a measuring tube which includes a sensor having a first temperature sensor element and at least a second temperature sensor element, which preferably contain resistance thermometers, wherein at least one of the temperature sensor elements is heatable, and wherein the sensor has a longitudinal axis and an end face, which is divided into at least two adjoining segments. In such case, at least a first segment is embodied in a sectional view as a surface inclined relative to a plane extending orthogonally to the longitudinal axis. The first segment, respectively the surface formed by the segment, has a surface normal vector, which forms with the longitudinal axis of the sensor an angle of at least 5°. In such case, one of the two temperature sensor elements functions as an active sensor element and the second of the two temperature sensor elements as a passive sensor element.

The particular geometry of the end face of the sensor expands the measuring range of the thermal, flow measuring device.

The end face can advantageously be divided into at least three segments, an upstream, first side segment, a middle segment and a downstream, second side segment, wherein the first segment is the upstream, first side segment and/or the downstream, second side segment. Upstream is with reference to the measuring tube longitudinal axis, which provides a flow direction of the medium, wherein the flow direction extends from a first opening of the measuring tube, through which the medium flows in, to a second opening, through which the medium flows out of the measuring tube. Downstream is the direction opposite the upstream direction. By this division, a flow of the medium can occur in the flow direction toward or away from the side segment.

It is advantageous when the surface normal vector of the inclined surface of the first segment forms with the longitudinal axis an angle of at least 8°, especially preferably between 10-35°. The inclination of the surfaces in this range has proven to be especially favorable for expanding the measurement range.

The upstream, first side segment can advantageously have a greater area than the downstream, second side segment.

For forming an especially optimized velocity profile of the measured medium, it is advantageous when between the upstream, first side segment and the middle segment a first intersection edge is defined, and that between the downstream, second side segment and the middle segment a second intersection edge is defined, and wherein the separation between the flow direction opposed, peripheral point of the upstream, first side segment and the first intersection edge essentially equals the separation between the flow direction, peripheral point of the downstream, second side segment and the second intersection edge.

The end face is preferably provided by sheet metal arranged between the measured medium and the temperature sensor elements and wherein the sheet metal is advantageously between 0.5-0.7 mm thick, in order to achieve a better balancing of the mechanical stability of the end face and response behavior of the sensor. This advantageous wall thickness holds both for the embodiment of FIG. 13 as well as also that of FIGS. 1-4 and all additional variants of the sensor.

Furthermore, it is advantageous for all sensor variants of the present invention to have perpendicular to the stream direction S of the flow of the medium at the middle segment at each side of the middle segment, in each case, an adjoining support segment stabilizing the middle segment. This likewise enables a greater mechanical stability.

The stabilizing support segment is angled from the plane of the middle segment and, indeed, advantageously at an angle between 10-80°, especially preferably at an angle from 50-70°.

In order to achieve an optimal heat transfer on the medium, it is advantageous to have the first heatable resistance thermometer be embodied as a plate shaped, thin layer element, especially one oriented essentially parallel to the area of the first segment.

In order to achieve a favorable flow guidance of the medium along the end face, it is advantageous when the middle segment 3b has an area with a surface normal vector, which extends along the longitudinal axis.

In order advantageously to enable a large measuring range, the first segment should form at least 5%, preferably at least 15%, especially 20-40%, of the end face.

It is advantageous, when the first segment is designed to form a comparatively thick thermal boundary layer in a flowing medium.

It is advantageous, when each of the first and second temperature sensor elements has two operating states, wherein in a first operating state of the temperature sensor element is kept at a constant temperature and in a second operating state the temperature sensor element ascertains the temperature of the medium, wherein the first temperature sensor element is located in the first operating state when the second temperature sensor element is located in the second operating state and wherein the thermal, flow measuring device has a circuit for switching the first and second temperature sensor elements between the first and second operating states. This is especially favorable in the case of a flow reversal, in which case the arrangement of the active sensor element and the passive sensor element can be switched.

According to the invention, a corresponding thermal, flow measuring device as claimed in one of the preceding claims serves for determining and/or monitoring the mass flow of a liquid flowing through a measuring tube.

BRIEF DESCRIPTION OF THE DRAWINGS

Several examples of embodiments of the invention will now be described in greater detail based on the drawing, the figures of which show as follows:

FIG. 1 is a sectional view of a sensor of the invention for a thermal, flow measuring device;

FIG. 2 is a side view of the sensor;

FIG. 3 is a plan view onto an end face of the sensor;

FIG. 4 is a perspective view of the sensor;

FIG. 12 is a sectional view a third sensor of the invention;

FIG. 13b is a plan view onto the fourth sensor of the invention;

FIG. 13c is a sectional view of the fourth sensor of the invention along the cutting plane B-B of FIG. 13b;

FIG. 16a shows the stress and deflection in the case of pressure of 40 bar in the case of the sensor with a sensor end surface according to FIG. 4;

FIG. 16b shows the stress and deflection in the case of pressure of 40 bar in the case of the sensor with a sensor end surface according to FIG. 13;

FIG. 16c shows the stress and deflection in the case of pressure of 60 bar in the case of the sensor with a sensor end surface according to FIG. 4; and FIG. 16d shows the stress and deflection in the case of pressure of 60 bar in the case of the sensor with a sensor end surface according to FIG. 13.

DETAILED DISCUSSION IN CONJUNCTION WITH THE DRAWINGS

Figure 5:
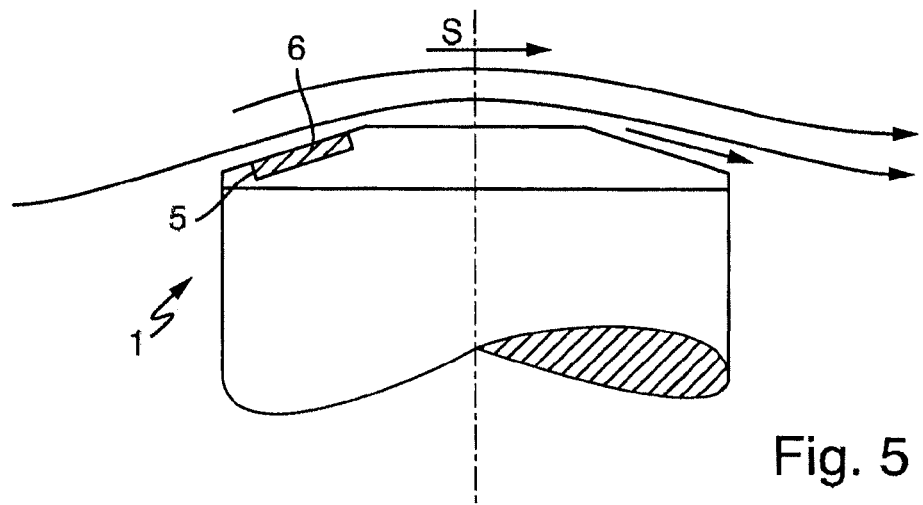
FIG. 5 is a schematic representation of flow on the end face of the sensor in the case of low velocities.

FIG. 1 shows a sensor of a thermal, flow measuring device, wherein the sensor is embodied as a thermal, mass flow sensor 1.

Conventional, thermal, flow measuring devices usually use two heatable resistance thermometers, which are embodied as equally as possible and arranged in, most often, pin-shaped, metal sleeves, so-called stingers, or in cylindrical metal sleeves in thermal contact with the medium flowing through a measuring tube or through the pipeline. For industrial application, the two resistance thermometers are usually installed in a measuring tube; the resistance thermometers can, however, also be mounted directly in the pipeline. One of the two resistance thermometers is a so-called active sensor element, which is heated by means of a heating unit. Provided as heating unit is either an additional resistance heater, or, in case the resistance thermometer is a resistance element, e.g. an RTD-(Resistance Temperature Device) sensor, such is heated by conversion of electrical power, e.g. by a corresponding variation of the measuring electrical current. The second resistance thermometer is a so-called passive sensor element: It measures the temperature of the medium.

Usually in a thermal, flow measuring device, a heatable resistance thermometer is so heated that a fixed temperature difference is maintained between the two resistance thermometers. Alternatively, it is also known to supply via a control unit a constant heating power.

If there is no flow in the measuring tube, then an amount of heat constant with time is required for maintaining the predetermined temperature difference. If, in contrast, the medium to be measured is moving, then the cooling of the heated resistance thermometer is essentially dependent on the mass flow of the medium flowing past. Since the medium is colder than the heated resistance thermometer, the flowing medium transports heat away from the heated resistance thermometer. In order thus in the case of a flowing medium to maintain the fixed temperature difference between the two resistance thermometers, an increased heating power is required for the heated resistance thermometer. The increased heating power is a measure for the mass flow, respectively the mass flow of the medium through the pipeline.

If, in contrast, a constant heating power is fed in, then, as a result of the flow of the medium, the temperature difference between the two resistance thermometers lessens. The particular temperature difference is then a measure for the mass flow of the medium through the pipeline, respectively through the measuring tube.

There is, thus, a functional relationship between the heating energy needed for heating the resistance thermometer and the mass flow through a pipeline, respectively through a measuring tube. The dependence of the heat transfer coefficient on the mass flow of the medium through the measuring tube, respectively through the pipeline, is utilized in thermal, flow measuring devices for determining the mass flow. Devices, which operate according to this principle, are manufactured and sold by the the company, Endress+Hauser, under the marks, 't switch', 't trend' or 't mass'.

In ascertaining the mass flow, a thermal, flow measuring device can in the case of measuring liquids reach a highest power limit. Since liquids have compared with gases essentially higher thermal conduction coefficients, at higher velocity a greater heat energy is transported away from the surface of the active temperature sensor. In the case of increasing velocity of the medium, a saturation of the sensor characteristic curve, respectively the upper power limit of the measuring electronics, is rapidly achieved, so that the measuring range of liquids is limited to small flow velocities. This disadvantage is removed by a sensor of a thermal, flow measuring device such as shown in FIGS. 1-2.

FIGS. 1-4 show in different views a sensor 1 for a thermal, flow measuring device. Sensor 1 includes a sensor body 2 with a cylindrical shape, a longitudinal axis A and a terminal end face 3 with a midpoint M, through which the longitudinal axis A extends. This cylindrical sensor body has a diameter d between preferably 10-30 mm, especially between 15-22 mm. End face 3 is divided into a number of segments 3a-3c. The segments are arranged next to one another with a first side segment 3a, a middle segment 3b and a second side segment 3c.

In such case, at least a first side segment in the sectional view of FIG. 1 is embodied as a surface inclined relative to the longitudinal axis A. The surface normal vector of the inclined surface forms with the longitudinal axis an angle a of preferably at least 5°, preferably at least 8°, especially preferably between 10-35°. In such case, the surface can especially be embodied flat, have irregularities due to surface roughness or be arc shaped toward the measured medium or away from the measured medium.

The first side segment 3a is preferably a side segment, whose surface is inclined in the direction of the flowed on side of the sensor 1, thus counter to the flow direction S.

Arranged behind the first side segment 3a is a first temperature sensor element having a first resistance thermometer 4, whose construction will now be described in greater detail based on an example of an embodiment. Resistance thermometer 4 is preferably embodied as a thin layer element. Resistance thermometer 4 has a three layer construction, including a ceramic substrate, a meander shaped metal layer, preferably of platinum, and a glass protective layer arranged thereon. The metal wire has a supply and a drain.

Temperature measurement occurs by exploiting the temperature dependence of electrical resistance in the case of conductance of electrical current. In this operating state, the resistance thermometer 4 can be applied as a passive sensor element. The above-described resistance thermometer 4 measures as passive sensor element the temperature of the medium and introduces as an active sensor element with adjustment of the electrical current level also an amount of heat into the medium. Then the resistance thermometer 4 of the first side segment 3a is an active sensor element, which has a constant temperature and emits heat energy to the medium flowing past.

This sensor element, respectively resistance thermometer 4, is preferably constructed as a plate shaped, thin layer element. In an especially preferred embodiment of the invention, the plate-shaped thin layer element is oriented essentially parallel to the surface of the first side segment 3a. Smaller deviations of less than 10°, preferably less than 5°, from the parallel plane can occur in such case.

In the following, a first embodiment will now be described, in which the first resistance thermometer 4, which is arranged on or behind the first side segment 3a, is operated as an active sensor element. In such case, the flowed on side of side element 3a is the segment of the end face 3, against which the flow of the medium first strikes in the flow direction S.

In manner similar to the first resistance thermometer 4, preferably a second temperature sensor element having a resistance thermometer 5 is arranged in the sensor 1 behind the second side segment 3c. In such case, this second resistance thermometer 5 functions in this first embodiment as a passive resistance thermometer for registering the temperature of the medium.

Especially preferably, the middle segment 3b has an area with a surface normal vector, which extends along the longitudinal axis. Smaller deviations of less than 1°, preferably less than 0.5°, from the parallel plane can occur in such case.

Furthermore, especially preferably, the second side segment in the sectional view of FIG. 1 is embodied as a surface inclined relative to the longitudinal axis A. Thus, its surface normal vector forms with the longitudinal axis A an angle β of preferably at least 5°, preferably at least 8°, especially preferably between 10-35°.

In such case, the surfaces of the sensor can especially be embodied flat, have irregularities due to surface roughness or extend arc shaped toward the measured medium or away from the measured medium.

This second side segment 3c is preferably a side segment, whose surface is inclined in the flow direction S of the measured medium.

The effects achieved by the particular embodiment of the sensor 1 in combination with the active sensor element 4 arranged at the first end 3a will now be explained in greater detail.

The inclination of the first side segment 3a arranged on the flowed on side effects an enlargement of the thermal boundary layer thickness compared to a level surface and a thin boundary layer develops comparatively uniformly over the entire surface. This boundary layer reduces the heat emission of the active sensor element. In other words, the presence of the boundary layer lessens the temperature gradient between medium and sensor surface, whereby a lesser heat input occurs. Due to the boundary layer, the sensor requires a smaller power in measurement operation.

In a second preferred embodiment of the invention, the second resistance thermometer 5 of the second side segment 3c arranged downstream is operated as an active sensor element and the first resistance thermometer 4 of the first side segment 3*a* arranged upstream is operated as a passive sensor element.

In the case of smaller flow velocities, a boundary layer structure occurs over the entire end face 3 of the sensor and is present with an especially great thickness in the downstream region. This is shown in FIG. 5. This boundary layer 6 enables, such as already described in the preceding example of an embodiment, a smaller heat input into the medium and therewith a delaying of the degree of saturation at higher flow velocities of the medium.

Figure 6:
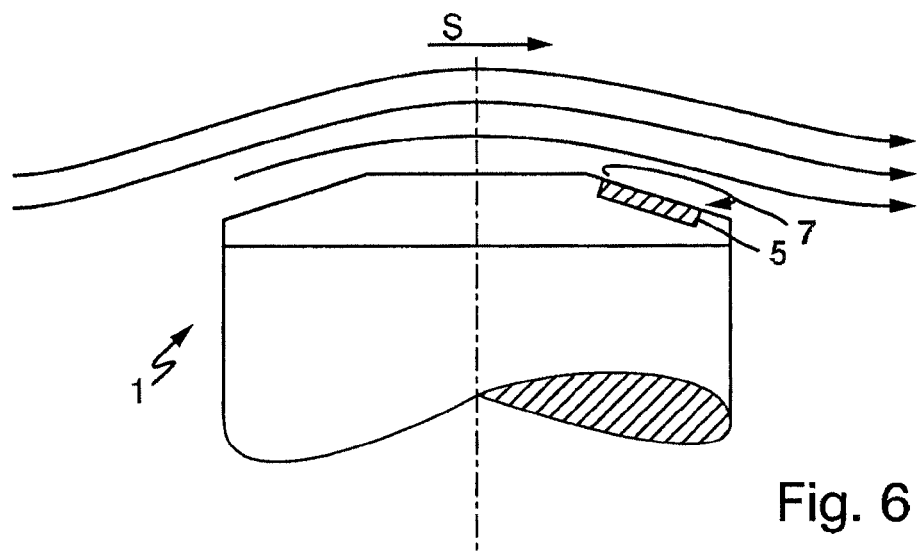
FIG. 6 is a schematic representation of flow on the end face of the sensor in the case of higher velocities.

In the rear part at the transition between the middle segment 3*b* and the second downstream side segment 3*c*, additionally a tearoff edge is created, where the flow tears off in the case of higher velocities. At the same time, in the case of increased velocity of the medium, a recirculation 7 occurs, thus a flow which is at least partially opposite to the principal flow direction. This is shown in FIG. 6. This recirculation is slower, preferably at least 60% slower, especially preferably at least 80% slower, than the main flow, but is, however, proportional to the main flow. The part of the recirculation directed opposite the main flow moves against the second downstream side downstream of the transition, respectively below the tearoff edge of the segment, and absorbs, in such case, a smaller heat energy than would be the case for the main flow. In this way, less power is required for maintaining the temperature and a power saturation occurs only at very high flow velocities.

Thus, the optimized geometry of the sensor relies on two different phenomena, the forming of a flow velocity dependent recirculation 7 in the downstream region at high velocities and the forming of the uniform boundary layer in the flowed on region.

In summary, the new sensor geometry delivers more stable and more reliable measured values than previous geometries.

The sensor shown in FIGS. 1-4 is excellently suited for flows in the case of low pressures up to, for instance, 20 bar. In such case, the sensor has in the region of the end face a wall thickness of preferably 0.3-0.5 mm, especially 0.38-0.42 mm. The wall thickness is optimized as regards the response time of the sensor.

In an additional embodiment (not shown), the end face is superimposed as a cap on a cylindrical sensor, so that the cap in the case fouling is simply exchangeable.

Alternatively, these caps can also be superimposed on already existing sensors, especially those with planar ends, so that a retrofitting of already existing sensors is possible.

Figure 7:
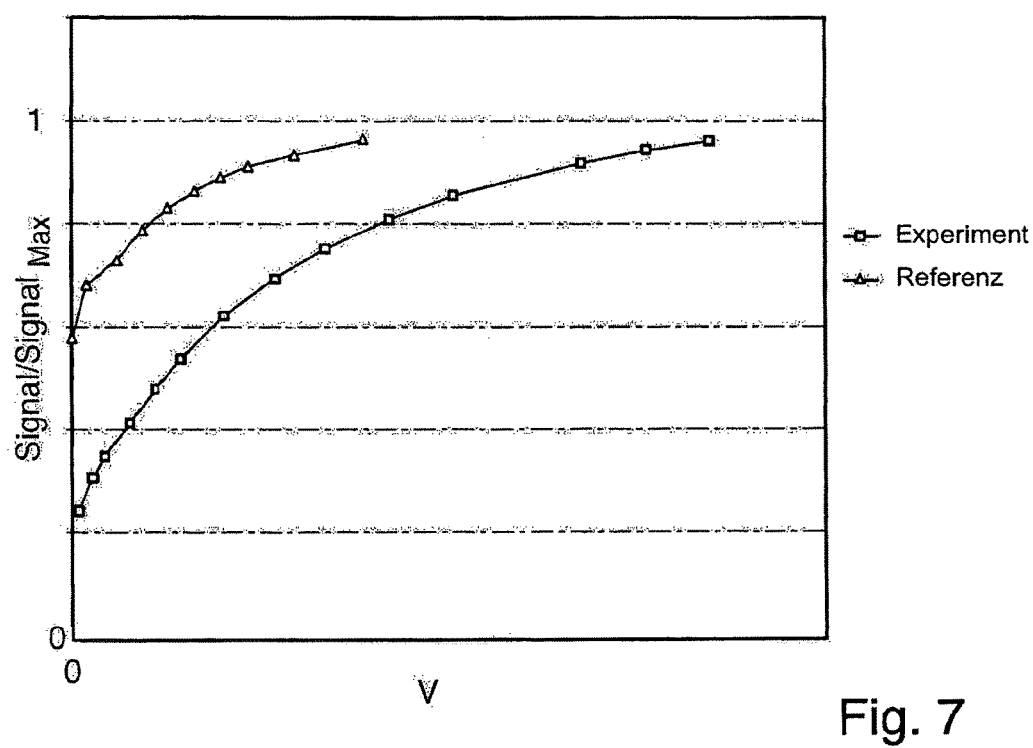
FIG. 7 is a characteristic curve of the sensor of the invention compared with a sensor with the same dimensions and a flat end face.
Figure 8:
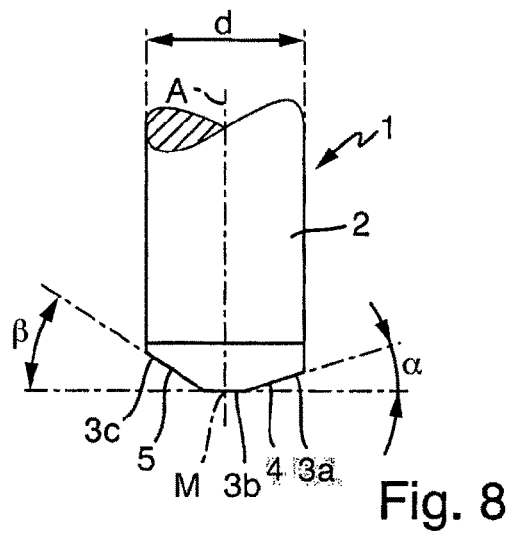
FIG. 8 is a sectional view of an additional sensor of the invention for a thermal, flow measuring device for measuring tubes with small nominal diameters.
Figure 9:
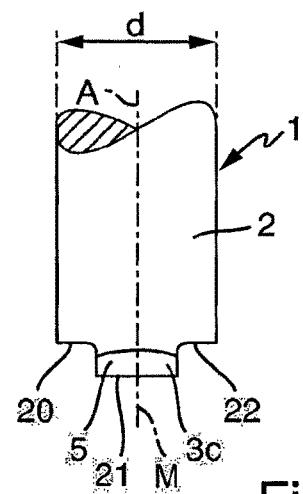
FIG. 9 is a side view of the additional sensor.
Figure 10:
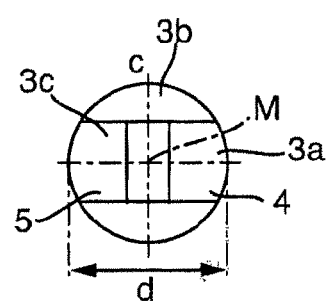
FIG. 10 is a plan view onto an end face of the additional sensor.
Figure 11:
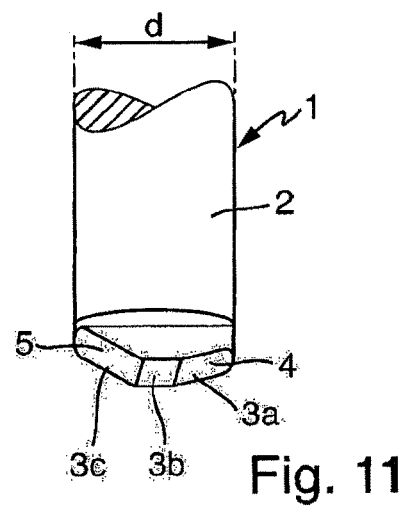
FIG. 11 is a perspective view of the additional sensor.

FIG. 7 describes in greater detail the influence of the geometry of the end face of a sensor of the invention on the characteristic curve. In such case, the flow velocity of a medium is measured on the X-axis, while the Y-axis gives a signal/signal(max.)-ratio, wherein signal(max.) represents the upper power limit of the sensor, for example, the maximum thermal power that can be fed in. The signal represents a current actual value, for example, a thermal power introduced into the medium. If the signal/signal (max.)-ratio reaches the value 1, then saturation has been reached and no further measuring is possible.

As one can detect based on FIG. 7, this saturation is reached at greater than twice the magnitude of the flow velocity (v).

The Biot number, which describes the heat transport from the surface to the surrounding medium for heat conduction through the body, is lessened due to the boundary layer in comparison with a sensor with predominantly flat end face.

The particular flow velocities at which a recirculation occurs, depends not least of all on the type of medium. Correspondingly, the angle of inclination of the side segments can vary in the case of different media.

Moreover, the end face of the sensor can advantageously have a web. Web shaped forming of the end face means less resistance to flow of medium, which leads, as a whole, to less pressure loss.

The web can preferably have a trapezoidal shape in the flow direction of the medium. Especially preferably, however, the end face has a step shaped construction, with two side steps and a middle step passing between the side steps.

It is advantageous to have the web protrude from the sensor by at least 5%, preferably greater than 10%, especially greater than 15%, of its path length, wherein the path length of the web extends transversely over the entire end face. In this way, a more exact registering of the temperature of the medium can be assured. The path length, in such case, follows the surface topology of the end surface. This path length corresponds in its minimum extent, in the case of a planar end face, to the diameter of the sensor. It can, however, also be greater than the diameter.

Especially, the web can protrude from the sensor by at least 20%, preferably greater than 40%, especially greater than 60% of its width. The width, in such case, refers to a planar surface perpendicular to the longitudinal axis of the sensor or to a planar surface inclined in or against the direction of the medium.

An example of an embodiment with a web is shown in FIGS. 8-11, by way of example.

Cylindrical sensor caps would create a blockage of the flow in the case of use in measuring tubes with smaller nominal diameters, which, due to the pressure losses arising, in such case, would negatively affect the accuracy of measurement of the sensor. For lessening pressure loss in the case of use in smaller tube diameters, the end face of the sensor of FIGS. 8-11 includes a web, which in the concrete example of an embodiment is embodied as a middle step 21. This web protrudes in the direction of a measuring tube axis in the case of the sensor in the installed state. Side regions arranged laterally of the web are set back relative to the web. This setback of the side regions can occur in steps, such as is shown in FIGS. 8-11 or by slopes, in which case the web has a trapezoidal shape. In the following, details of a web will be described, which is formed by an end face embodied with step shape.

While the aforementioned segments 3*a*-3*c* comprising the middle segment and the two side segments are arranged relative to one another on a first axis C, the step shaped construction of the sensor follows a second axis, the longitudinal axis A, which is perpendicular to the first axis C. In such case, the web does not absolutely have to have a segmented construction on its outer surface facing the medium, but can, instead, have a planar area. However, the segmented construction is especially advantageous due to the above-described properties.

The step shaped construction includes three steps, a first side step 20, the middle step 21 and a second side step 22. The middle step in the case of the installed state of the sensor protrudes beyond the side steps in the direction of the measuring tube axis. Arranged on the middle step are the aforementioned resistance thermometers.

The side regions, here embodied as a side steps, offer a lesser resistance to the flow of the medium to be measured compared with a cylindrically embodied, segmentally tilted end face.

The peripheral end points of the side steps define circular areas in such case. The web preferably protrudes at the midpoint by greater than 20% of its width and/or 5% of its length from this circular area, preferably by greater than 40% of its width and 10% of its length, especially greater than 60% of its width and 15% of its length.

In such case, the width of the web corresponds to at least 10% of the diameter of the sensor, The embodiment shown in FIGS. 8-11 can preferably be used in the case of flow measuring devices with measuring tubes of a nominal diameter of less than or equal to DN50, especially, however, in the case of nominal diameters of DN15 and DN25.

FIG. 12 shows the connection of the temperature sensor elements to an evaluation unit in greater detail. In such case, the sensor described in FIGS. 1-7 has the housing comprising a housing body and a housing chamber, in which housing chamber are arranged terminally the two temperature sensor elements, which are embodied especially as thin-film, resistance thermometers, wherein one of the temperature sensor elements is heatable, wherein from each temperature sensor element at least one connection wire leads away, which is connected with a circuit board, wherein the circuit board is arranged in the housing chamber, wherein the circuit board is positioned in the housing chamber by a snap-in connection.

Positioning the circuit board in the housing chamber by means of a snap-in connection facilitates the assembly.

It is additionally advantageous when the housing chamber has a reinforcing layer, which reinforcing layer has or forms a recess or a protrusion for the snap-in engagement of the circuit board.

This is especially advantageous when a terminally located part of the housing is embodied as a deep draw cap with a wall thickness of less than 2 mm, preferably less than 1.5 mm, especially less than 0.8 mm.

To enable a lasting connection of the reinforcing layer to the housing body, a material bond can be provided between the two components, for example, by welding or soldering.

The connection wire of the first temperature sensor element is advantageously led with tension relief in a first direction through the circuit board and connected with the circuit board.

An especially advantageous two-sided strain relief is achieved by leading at least one connection wire of a second temperature sensor element with strain relief in a second direction through the circuit board opposite to the first direction and connected with the circuit board.

It is additionally advantageous when the connection wires are surrounded with a potting compound in the region of the circuit board. Mainly, the potting compound provides mechanical strength during ordinary operation of the sensor.

The housing chamber can advantageously have at least a first elastic body for leading the connection wires.

The elastic body, which can be a disk, for example, guides the connection wires during the production process and provides a smaller susceptibility of the measurement signal to vibrations.

It is advantageous when the housing, especially the housing chamber, has a second elastic body, which bears against the first elastic body and/or a wall of the housing and exerts a return force on the engaged circuit board. In this way, a better snap-in action is achieved.

The housing chamber includes a potting compound, while the temperature sensor elements are advantageously arranged in the housing chamber free of potting compound.

Especially, the first and second elastic bodies can be silicone bodies. Silicone has good temperature resistance and good chemical durability.

A good state of sealing by the elastic bodies, especially when they are embodied as silicone bodies, can also be achieved in the case of temperature sensors, which are embodied as four conductor measuring devices.

Alternatively or supplementally, the temperature sensor, especially the sensor for the thermal, flow measuring device, includes a housing comprising a housing body and a housing chamber, in which housing chamber are arranged terminally two temperature sensor elements, which are embodied especially as thin-film resistance thermometers, wherein one of the temperature sensor elements is heatable, wherein from each temperature sensor element at least one connection wire leads away, which is connected with a circuit board, wherein the circuit board has a first number of cavities, especially holes, for the connection of connection wires and/or cables and a second number cavities, especially holes, for reducing thermal expansion of the circuit board.

By reducing the thermal expansion, damage to the circuit board can be prevented, such as can happen e.g. in the case of the potting compound, due to different thermal expansions between the circuit board and the potting compound.

In such case, the second number of cavities, especially holes, can be located in conductive traces arranged on the circuit board.

The connection concept of the sensor will now be discussed in detail based on FIG. 12.

In the third example of an embodiment for a sensor preferred in FIG. 12, components are integrated, which serve for facilitating the manufacture and reducing the reject rate. The sensor shown in FIG. 12 has essentially the sensor geometry of the sensor of FIGS. 1-7.

Inserted terminally in the housing chamber are resistance thermometers (RTD) 4 and 5 each parallel to one of the side segments 3*a* and 3*c*. At least one of the resistance thermometers is heatable. The resistance thermometers (RTD) 4 and 5 in the present example of an embodiment are embodied as thin-film resistance thermometers. For simplification, only the arrangement of one of the resistance thermometers 4 and 5 in the housing chamber will be explained.

The resistance thermometer is soldered on the inner side of the housing 1 in the housing chamber. Leading from the resistance thermometer 20 are two signal paths here in the form of connection wires 23, which preferably are gold coated. These connection wires connect the thin-film resistance thermometers to a circuit board 25.

The connection wires of the first of the two resistance thermometers are arranged in a first direction into the circuit board 25 and the connection wires of the second of the two resistance thermometers are arranged on or in a second direction opposite the first direction at or into the circuit board 25.

Terminally in the end region, the housing body is advantageously formed by a deep draw cap with reduced wall thickness of preferably between 0.5 and 2 mm. In this way, rapid heat transfer between the resistance thermometer 4 or 5 and the medium is enabled.

As recognizable in FIG. 12, the connection wires are, first of all, in each case, guided along the sides of the housing chamber. Then, the connection wires 23 are led to a circuit board 25 and secured with strain relief to the circuit board 25. The strain relieving securement of the connection wires facilitates the mounting of the temperature sensors.

The connection wires of the first of the two resistance thermometers are arranged in a first direction in the circuit board 25 and the connection wires of the second of the two resistance thermometer are arranged on or in a second direction opposite the first direction on or in the circuit board 25. By this arrangement, cable 27, respectively four conductor cable, can be led away on both sides of the circuit board. The changed arrangement of the connection wires and the cable, respectively four conductor cable, on the circuit board facilitates assembly.

Leading away from the circuit board 25 are a number of signal paths, present in the form of jacketed cables 27, which connect the temperature sensor with an evaluation unit. These extend unilaterally in FIG. 2 away from the circuit board.

After the mounting of the temperature sensor, the inner space of the temperature sensor is filled with a potting compound.

Circuit board 25 includes lateral snap-in elements 28, which can engage with recess means 29 of the housing 1 or alternatively with a protrusion of the housing. The snap-in engagement positions the circuit board at a predetermined location in the housing means.

Creating the recess means 29 requires, however, a certain wall thickness, so that the recess means can be milled-in in the form of a groove. This cannot, however, be assured, due to the reduced wall thickness of the terminal deep draw cap. According to the invention, consequently, a reinforcing element with a recess means, preferably a peripheral groove, is arranged in the housing chamber on the wall of the deep draw cap.

This reinforcing element 31 enables a snap-in connection of the circuit board 25 with the housing 1.

Alternatively or supplementally, also the housing 1 can have snap-in elements, which can engage with recess means or a protrusion of the circuit board 25. These snap-in elements can likewise be provided by a reinforcing element, which is arranged on the deep draw cap.

The housing chamber of the temperature sensor is terminally filled with silicone bodies 32, 33 between the circuit board and the housing wall with the resistance thermometers mounted thereon. The resistance thermometers remain, thus, after the potting of the sensor free of potting compound, since they are shielded by the silicone body from contact with the potting compound.

At the same time, the silicone bodies develop due to their inherent elasticity return forces, which act on the circuit board 25 and enable a more effective snap-in retention. In such case, the circuit board preferably touches at least one of the silicone bodies.

The strain relieving securement, respectively connection, of the connection wires 23 to the circuit board 25 will now be explained in greater detail.

Such occurs by leading the connection wires through a first hole in the circuit board 25, then in a direction perpendicular to the passageway of the first hole and then in a direction parallel to the passageway to the circuit board and then securing them. Thus, the securement occurs on a wall of the circuit board, which extends parallel to the first hole. Consequently, the connection wires are inserted in a first direction A into the hole of the circuit board and secured in a second direction B, which is opposite to the first direction A, on the circuit board.

Such strain relieving arrangements on boards are known from other fields of application and serve for a lasting securement of connection wires to a circuit board.

In the present case, however, the strain relief of the connection wires serves only for a better stability of the connections before the potting. Therefore, the strain relieving securement essentially facilitates the assembly of the temperature sensor.

In such case, individual measures, which per se already provide advantages, ideally contribute to a total concept.

The aforementioned connection concept can basically be applied to all known multi-conductor measuring techniques of thermal flow measurement.

Figure 13A:
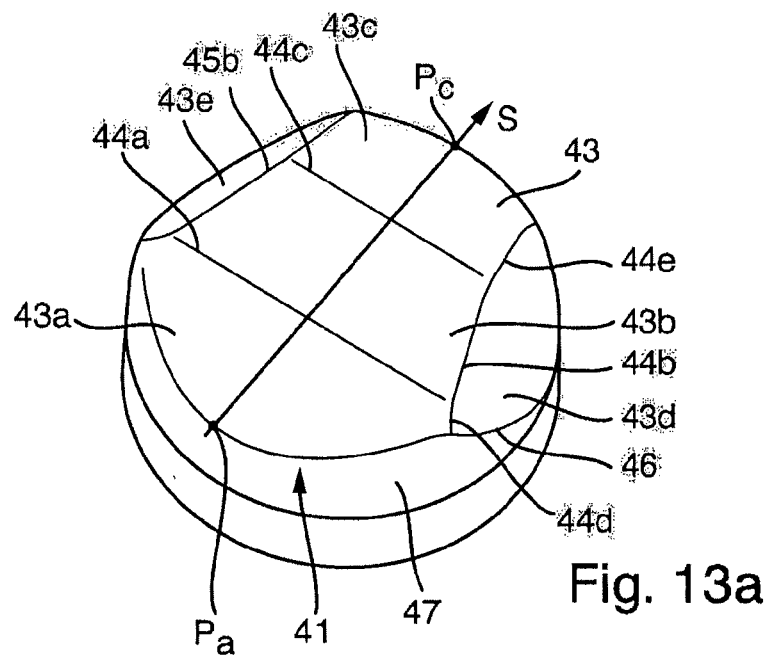
FIG. 13a is a perspective view of the end face of a fourth sensor of the invention.
Figure 14:
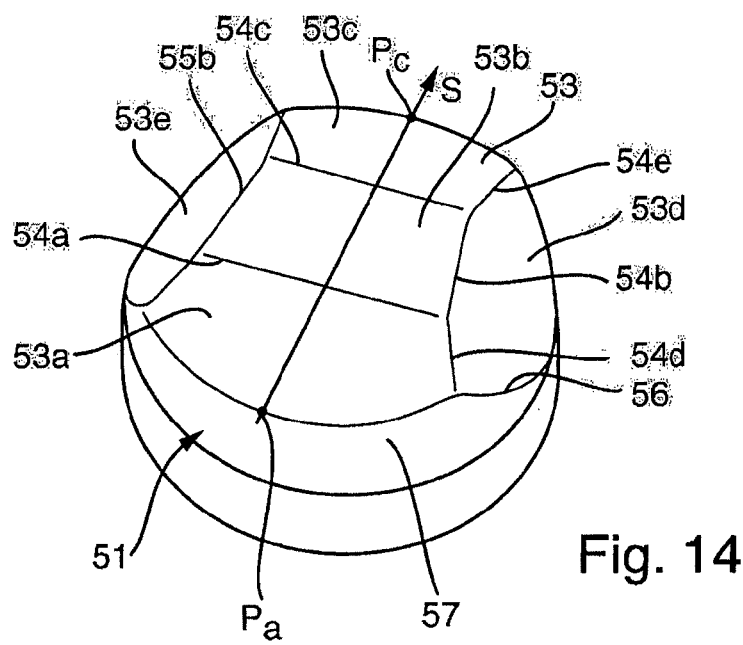
FIG. 14 is a perspective view of the end face of a fifth sensor of the invention.

FIGS. 13 and 14 show fourth and fifth variants of the invention of sensors 41 and 51 for a thermal, flow measuring device. These sensors include end faces 43, 53, which are adapted for higher pressures, especially over 20 bar. The dividing of the end faces 43, 53 in the flow direction S of the medium corresponds to that embodiment illustrated in FIGS. 1-4. Thus, the end faces 43, 53 are divided into middle segments 43b, 53b, which essentially extend on a plane perpendicular to the longitudinal axis A of the sensor, and two sloping side segments 43a, 53a and 43c, 53c. Wall thickness in the region of the end face of the sensor is preferably between 0.5-0.7 mm, especially preferably between 0.55-0.65 mm. The heater, thus the active sensor element, is located, in such case, preferably behind the side segment 43a, 53a, which is arranged on the flowed-on side in the measured medium. The passive sensor element is located preferably behind the downstream, side segment 43c, 53c of the sensor 41, 51.

On its edges, the middle segment 43b, 53b is limited in the flow direction S of the medium by intersection edges 44a, 44c formed with the side segments 43a, 53a and 43c, 53c. Located on each side of the middle segment 43b, 53b in the direction perpendicular to the flow direction S of the medium are support segments 43d, 53d and 43e, 53e stabilizing the middle segment 43b, 53b.

These support segments 43d, 53d or 43e, 53e slope away from the plane of the middle segment 43b, 53b with an angle γ between 10-80°, especially preferably with an angle of 50-70°, in such a manner that between the middle segment and the support segments 43d, 53d or 43e, 53e, in each case, an intersection edge 44b, 54b and 45b, 55b is formed.

In the following, for simplification, only the geometry of the support segment 43d of FIG. 13 will be described in greater detail. It is evident, however, from FIG. 13 that the following geometric features apply mirror symmetrically also to the support segment 43e.

The embodiment shown in FIG. 13 includes supplementally to the aforementioned intersection edge 44b other adjoining intersection edges 44d, 44e, in each case, between the support segment 43d or 43e and the side segments 43a and 43c adjoining the middle segment in the flow direction S. The adjoining intersection edges 44d and 44e are, in such case, not equally large and mirror symmetric relative to a mirror plane extending through the sensor midpoint, but, instead, are asymmetrically embodied. The support segment 43d is additionally bounded by an arc shaped intersection edge 46, at which the support segment 43d transitions into a cylindrical lateral surface 47.

As evident in FIG. 13, the asymmetric forming of the support segments 43d and 44e provides a bounding of the side segments 43a and c, in which case these side segments are no longer embodied equally large, but, instead, the front side segment 43a in the flow direction S, at the same time providing a flowed on side for the medium, is larger than the rear side segment 43c in the flow direction S, at the same time providing a downstream side for the medium. The area of the planar, flowed-on, side segment is preferably 1.1 to 2-times, especially preferably 1.2 to 1.5-times, greater than the area of the planar, downstream, side segment 43c.

The area of the planar middle segment 43b is preferably 0.8 to 1.2 times the area of the adjoining, planar, flowed-on, side segment 43a. They are each greater than the area of the downstream, side segment 43c.

The areas of the planar, sloping, support segments 43d and 43e are preferably 0.5 to 0.8 times that of the middle segment 43b.

Located between the side segments, the middle segment and the support segments are the above-described intersection edges 44a -44e . These edges are rounded and have a bending radius between 1.3 to 3 mm. In this way, an especially soft transition between the individual surfaces is assured and a uniform boundary layer of the measured medium developed on the end face 43.

The two embodiments illustrated in FIGS. 13 and 14 provide more pressure stable sensor geometries compared with the form of embodiment illustrated in FIGS. 1-4.

The asymmetric variant shown in FIG. 13 for the adjoining intersection edges 43d and 43e is preferred over the variant illustrated in FIG. 14. In contrast, the less preferred embodiment shown in FIG14 has symmetric intersection edges 54d and 54e bordering on the middle segment 54b, as well as less tilted and equally large flowed-on and downstream side segments 53a and 53c bordering on the middle segment 53b.

FIGS. 15a -15f shows velocity profiles for the flow on the end faces 43, 53 of the sensors 41 and 51.

Figure 15A:
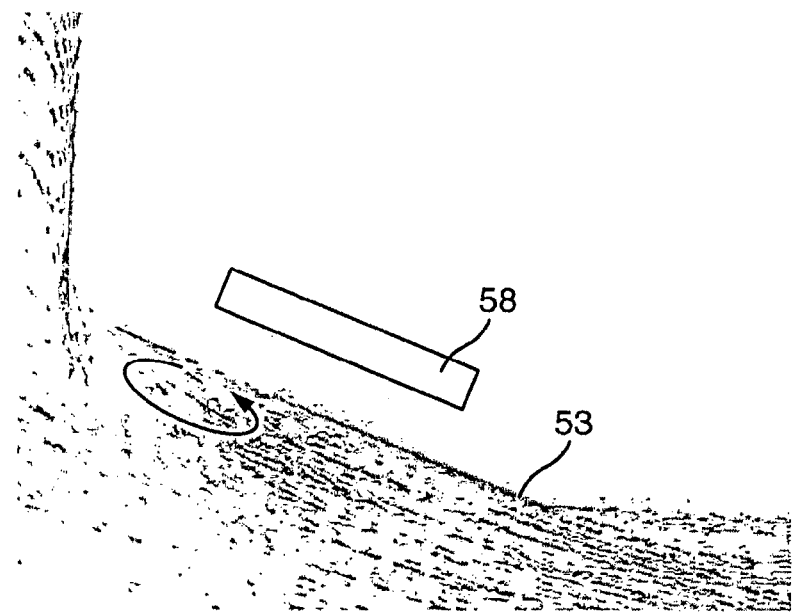
FIGS. 15a-15f show comparison of the flow fields of the fourth and fifth sensors of the invention in the case of different flow velocities.
Figure 15B:
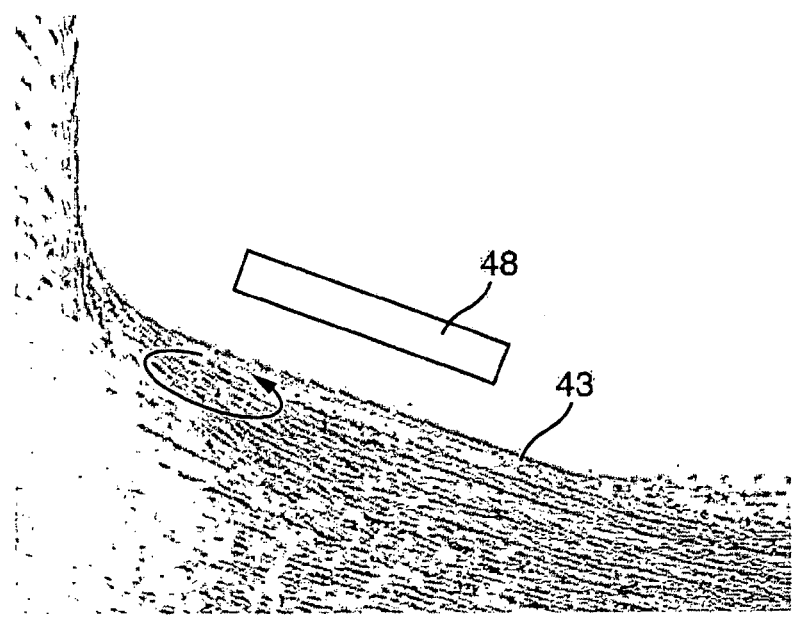
Figure 15C:
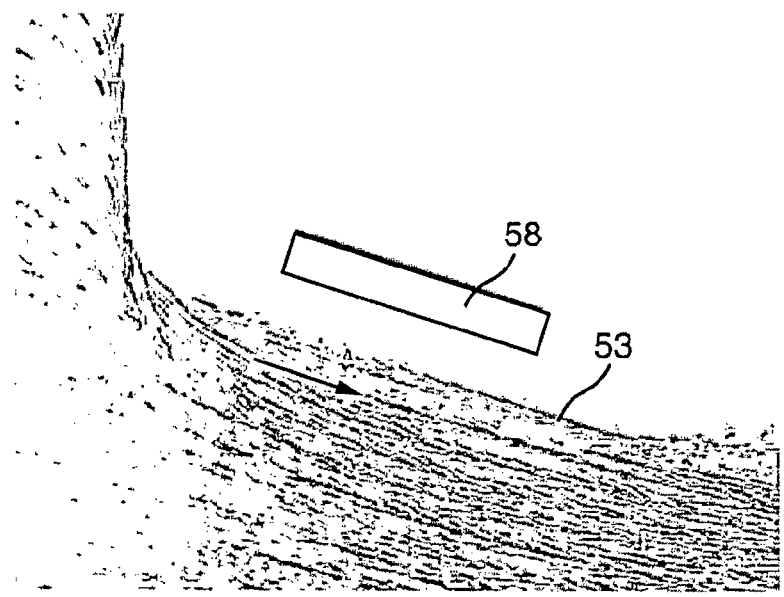
Figure 15D:
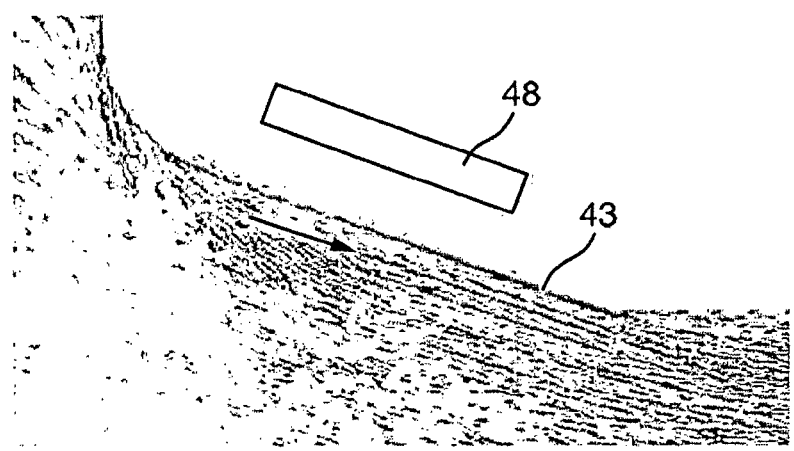

FIGS. 15a , 15b show the velocity profile in the case of 0.7 m/s. FIGS. 15c , 15d show the velocity profile in the case of 2 m/s and FIGS. 15e , 15f show the velocity profile in the case of 4 m/s.

Figure 15E:
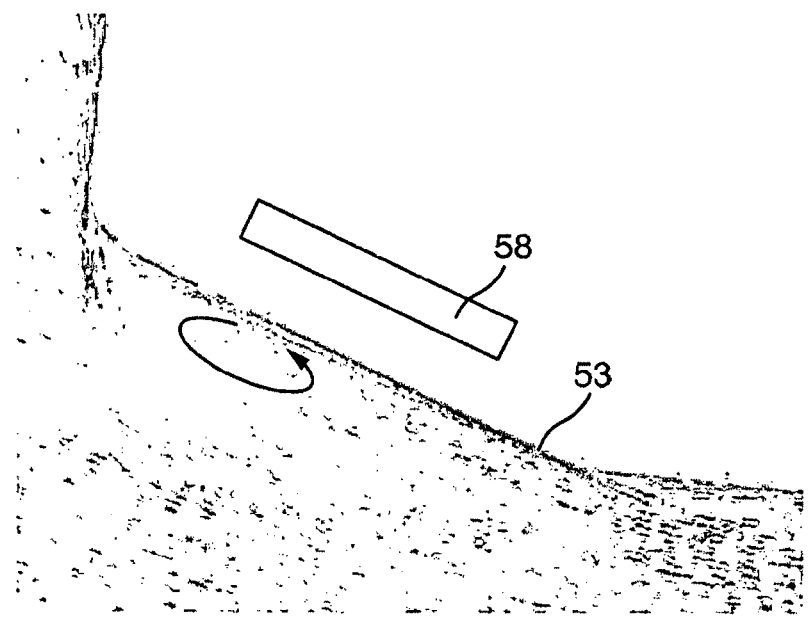
Figure 15F:
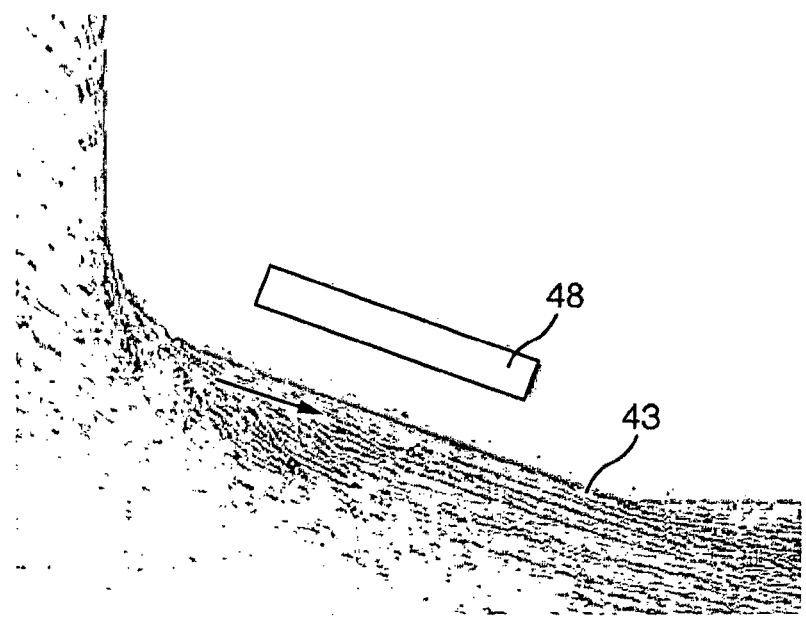

FIGS. 15a , 15c and 15e refer, in such case, to the above-described sensor geometry shown in FIG. 14. FIGS. 15b , 15d and 15f represent the velocity profile in the case of the variant illustrated in FIG. 13.

The measured medium in FIGS. 15a -15f is water. The bar behind the end represents a simplified, heatable, temperature sensor 48, 58.

In such case, the velocity profiles of FIGS. 15a, c and e of the sensor of FIG. 14 have a stronger vortex, respectively recirculation, of the velocity profile of the measured medium in the region of the heatable temperature sensor 58. In this way, less heat is transported away from the surface of the sensor 51. In such case, however, the heat transfer is also dependent on the extent of the vortex and therewith on the velocity of the medium along the end face 53. This results in discontinuous transitions in the curve in the case of recording a characteristic curve, which is unfavorable for evaluating the curve. Ideally, an adjoining boundary layer over the heater, respectively the heatable temperature sensor, should form as a result of a local slowing and/or turbulence of the flow. In these cases, the heating rate between the fixed phase (the sensor end surface) and the liquid phase (the measured medium) increases and the Biot number decreases. The partial slowing should be consistent over the total measuring range. In this way, a characteristic curve is formed without discontinuous transitions and with high sensitivity.

The sensor geometry shown in FIG. 13 has, such as evident in the velocity profiles FIGS. 15b , 15d , and 15f , in contrast, likewise a reduced tendency for forming recirculation. However, there lies on the surface of the end a thin boundary layer, which provides a discontinuity free, uniform curve form for the sensor characteristic. In this way, a uniform flow is generated along the temperature sensor. The sensor is essentially independent of the flow velocity of the medium and has a higher sensitivity.

FIGS. 16a -16d show the stress distributions and deflections at the respective applied pressures. Since the metal sensor cap is elastically deformable, the deflected end surface essentially returns to its original shape in the case of pressure release.

Figure 16A:
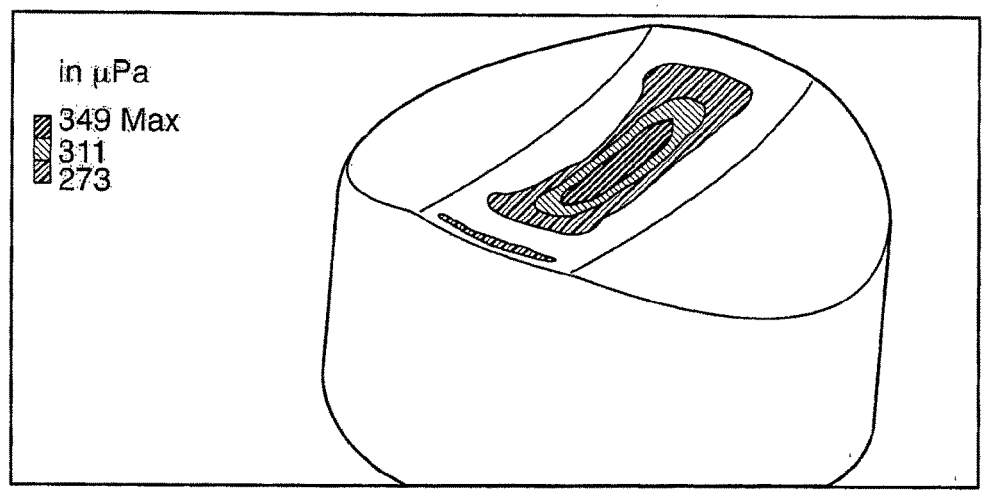
FIGS. 16a-16d show comparison of the sensor of the invention of FIGS. 1-4 and FIG. 13 in loading tests at 40 and 60 bar.
Figure 16B:
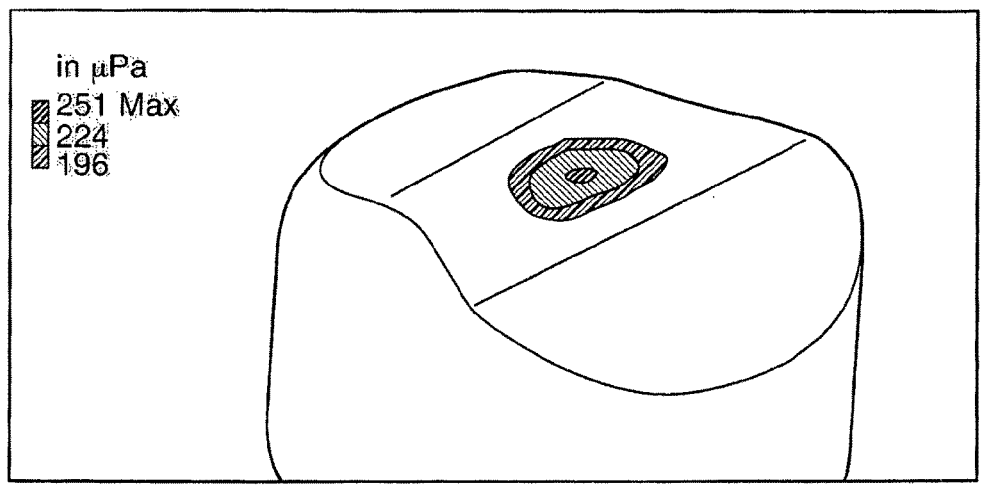
Figure 16C:
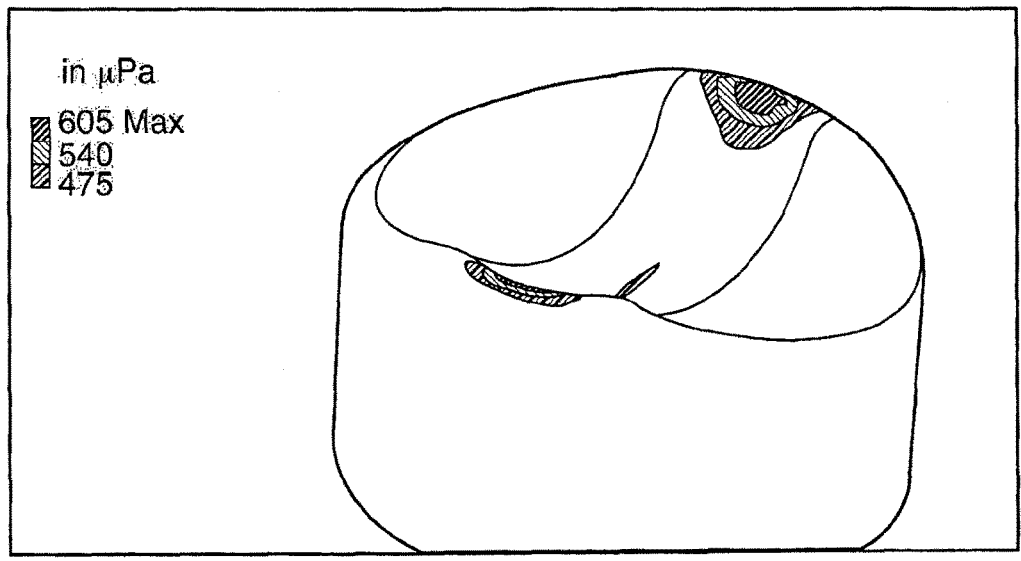

FIGS. 16a and 16c show the stress distribution on the end face of FIGS. 1-4. FIG. 16a shows stress distribution in the case of an external pressure of 40 bar. The maximum stress in this variant amounted to 350 MPa. The stress on the side segments of the end face are negligibly small. The significant stress occurs on the middle segment perpendicular to the stream direction S of the flow. The middle segment opposes increasing stress by an equilibrium deflection in the form of a concave curvature. This concave curvature increases—such as evident from FIG. 16c—in the case of application of 60 bar.

At a stress of 350 Mpa, the elastic limit of the sensor end surface of the sensor of FIGS. 1-4 (wall thickness=about 0.4 mm) is exceeded, so that besides an elastic deflection of the end face also a permanent plastic deformation of the end face occurs. This plastic deformation causes measurement error. The elastic limit of the sensor in the case of this embodiment amounts, for instance, to 310-330 MPa.

In contrast, the end face of the sensor of FIG. 13 (wall thickness about 0.6 mm) experiences—such as can be seen from FIG. 16b—a lesser stress of, for instance, 250 MPa, which additionally is distributed on a significantly smaller surface region of the end face of the sensor.

FIG. 16c shows the end face of the sensor of FIGS. 1-4 in the case of an external pressure of 60 bar. The end face is, in such case, plastically deformed to a high degree. The maximum stress on the surface lies at 600 Mpa.

Figure 16D:
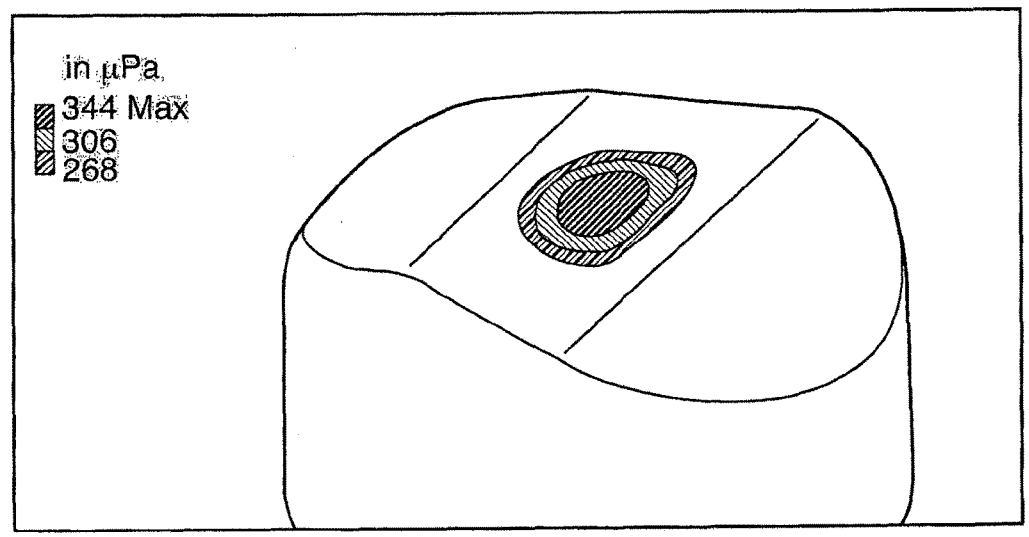

In contrast, the stress in the end face in the case of FIG. 16d at an external pressure of 60 bar is, for instance, 330-350 MPa.

The invention claimed is:

1. A thermal, flow measuring device for determining and/or monitoring a mass flow of a measured medium through a measuring tube, comprising:
   a sensor with at least first and second temperature sensor elements, which contain thin-film resistance thermometers, wherein:
   one of said temperature sensor elements is heatable, said sensor has a longitudinal axis and an end face, which is divided into at least two adjoining segments;
   a surface normal vector of at least a first segment forms with the longitudinal axis of said sensor an angle of at least 5°;
   the end face is divided into at least three segments, an upstream, first side segment, a middle segment and a downstream, second side segment;
   the first segment is the upstream, first side segment; and
   the upstream, first side segment has a greater area than the downstream, second side segment.

2. The thermal, flow measuring device as claimed in claim 1, wherein:
   the surface normal vector of the inclined surface of said first segment forms with the longitudinal axis an angle of at least 8°, especially preferably between 10-35°.

3. The thermal, flow measuring device as claimed in claim 1, wherein:
   between said upstream, first side segment and said middle segment a first intersection edge is defined;
   between said downstream, second side segment and said middle segment a second intersection edge is defined; and the separation between the flow direction opposed peripheral point of said upstream, first side segment and said first intersection edge equals the separation between the flow direction, peripheral point of said downstream, second side segment and said second intersection edge.

4. The thermal, flow measuring device as claimed in claim 1, wherein:
said sensor has an end face of sheet metal arranged between the measured medium and said temperature sensor elements; and
said sheet metal is between 0.5 to 0.7 mm thick.

5. The thermal, flow measuring device as claimed in claim 1, wherein:
perpendicular to the flow direction of the medium at said middle segment on each side of said middle segment, a support segment stabilizes said middle segment.

6. The thermal, flow measuring device as claimed in claim 5, wherein:
said stabilizing support segment slopes from the plane of said middle segment at an angle between 10-80°, especially preferably at an angle from 50-70°.

7. The thermal, flow measuring device as a claimed in claim 1, wherein:
said first temperature sensor element is embodied as a plate shaped, thin layer element.

8. The thermal, flow measuring device as claimed in claim 1, wherein:
said first temperature sensor element is oriented essentially parallel to the area of said first segment.

9. The thermal, flow measuring device as claimed in claim 1, wherein:
said middle segment has an area with a surface normal vector, which extends along the longitudinal axis.

10. The thermal, flow measuring device as claimed in claim 4, wherein:
said first segment forms at least 5%, preferably at least 15%, especially 20-40%, of said end face.

11. The thermal, flow measuring device as claimed in claim 1, wherein:
said first segment is designed for forming a thermal boundary layer of increased boundary layer thickness.

12. The thermal, flow measuring device as claimed in claim 1, wherein:
said first segment is designed for forming a recirculation in a flowing medium.

13. The thermal, flow measuring device as claimed in claim 1, wherein:
said first and second temperature sensor elements are heatable and each has two operating states, in a first operating state said temperature sensor element is kept at a constant temperature and in a second operating state said temperature sensor ascertains the temperature of the medium;
said first temperature sensor element is located in said first operating state when said second temperature sensor element is located in said second operating state;
said first temperature sensor element is located in said second operating state when said second temperature sensor element is located in said first operating state; and
the thermal, flow measuring device has a circuit for switching said first and said second temperature sensor elements between said first and said second operating states.

14. The thermal, flow measuring device as claimed in claim 1, wherein:
said sensor has a sensor body and a sensor cap; and
a terminal end face is located on said sensor cap.

15. The use of a thermal, flow measuring device as claimed in claim 1, for determining and/or monitoring mass flow of a liquid flowing through a measuring tube.

* * * * *